US006944112B2

(12) United States Patent
Challener

(10) Patent No.: US 6,944,112 B2
(45) Date of Patent: Sep. 13, 2005

(54) HEAT ASSISTED MAGNETIC RECORDING HEAD WITH A PLANAR WAVEGUIDE

(75) Inventor: William A. Challener, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 4 days.

(21) Appl. No.: 10/392,015

(22) Filed: Mar. 19, 2003

(65) Prior Publication Data

US 2004/0001420 A1 Jan. 1, 2004

Related U.S. Application Data

(60) Provisional application No. 60/392,249, filed on Jun. 28, 2002.

(51) Int. Cl.[7] .............................................. G11B 7/135
(52) U.S. Cl. ................................................ 369/112.27
(58) Field of Search ......................... 369/112.27, 112.2, 369/14, 13.14; 385/124

(56) References Cited

U.S. PATENT DOCUMENTS

| 4,994,818 | A | | 2/1991 | Keilmann |
| 5,004,307 | A | | 4/1991 | Kino et al. |
| 5,121,256 | A | | 6/1992 | Corle et al. |
| 5,125,750 | A | | 6/1992 | Corle et al. |
| 5,144,604 | A | | 9/1992 | Sugiura |
| 5,808,973 | A | * | 9/1998 | Tanaka ........................ 369/14 |
| 5,930,434 | A | * | 7/1999 | Mowry et al. ............... 385/124 |
| 5,982,716 | A | | 11/1999 | Kino et al. |
| 5,986,978 | A | | 11/1999 | Rottmayer et al. |
| 6,016,290 | A | | 1/2000 | Chen et al. |
| 6,043,940 | A | | 3/2000 | Kamiyama et al. |
| 6,055,220 | A | | 4/2000 | Mamin et al. |
| 6,091,694 | A | | 7/2000 | Späth |
| 6,205,092 | B1 | * | 3/2001 | Yamaguchi et al. ...... 369/13.14 |
| 6,404,706 | B1 | | 6/2002 | Stovall et al. |
| 2001/0017820 | A1 | | 8/2001 | Akiyama et al. |
| 2001/0040841 | A1 | | 11/2001 | Sheih et al. |
| 2002/0021627 | A1 | | 2/2002 | Hasegawa et al. |
| 2002/0027865 | A1 | * | 3/2002 | Wilde et al. ............ 369/112.27 |
| 2002/0114567 | A1 | | 8/2002 | Novotny et al. |

FOREIGN PATENT DOCUMENTS

| EP | 0899721 A1 | | 3/1999 |
| JP | 02001272559 A | * | 10/2001 |
| WO | WO 01/97214 A2 | | 12/2001 |
| WO | WO 01/97214 A3 | | 12/2001 |
| WO | WO 03/060882 A1 | | 7/2003 |

OTHER PUBLICATIONS

S. M. Mansfield et al., "Solid Immersion Microscope", *Appl. Phys. Lett*, 57 (24), pp. 2615–2616, Dec. 10, 1990.
B.D. Terris et al., "Near–Field Optical Data Storage Using A Solid Immersion Lens", *Appl. Phys. Lett*, 65 (4), pp. 388–390, Jul. 25, 1994.
F. Zenhausern et al., "Apertureless Near–Field Optical Microscope", *Appl. Phys. Lett.* 65 (13), pp. 1623–1625, Sep. 26, 1994.

(Continued)

*Primary Examiner*—Tianjie Chen
(74) *Attorney, Agent, or Firm*—Benjamin T. Queen, II; Pietragallo, Bosick & Gordon

(57) ABSTRACT

A heat assisted magnetic recording head having a planar waveguide for heating a recording medium proximate to where a write pole of the recording head applies a magnetic write field thereto. The planar waveguide includes at least one edge, which may have a substantially parabolic shape, that is shaped to reflect an electromagnetic wave to a focal point within the planar waveguide. The planar waveguide includes a truncated end adjacent the focal point such that the truncated end intersects the focal point.

34 Claims, 4 Drawing Sheets

OTHER PUBLICATIONS

J. Takahara et al., "Guiding Of A One-Dimensional Optical Beam With Nanometer Diameter", *Optics Letters*, vol. 22, No. 7, pp. 475–477, Apr. 1, 1997.

I. Ichimura et al., "High-Density Optical Recording Using A Solid Immersion Lens", *Applied Optics*, vol. 36, No. 19, pp. 4339–4348, Jul. 1, 1997.

Y. Martin et al., "Optical Data Storage Read Out At 256 Gbits/in.$^2$" *Appl. Phys. Lett.*, 71 (1), pp 1–3, Jul. 7, 1997.

K. Ueyanagi et al., "Proposal Of A Near-Field Optical Head Using A New Solid Immersion Mirror", *Jpn. J. Appl. Phys.*, vol. 39, pp. 888–891, (2000).

K. S. Youngworth et al., "Focusing Of High Numerical Aperture Cylindrical-Vector Beams", *Optics Express*, vol. 7, No. 2, pp. 77–87, Jul. 17, 2000.

R. Coehoorn et al., "Hybrid Recording", *Magnetic Storage Systems Beyond 2000*, proceedings of the NATO-ASI on Rhodes (Greece), Jun. 2000.

M. A. Lieb et al., "A High Numerical Aperture Parabolic Mirror As Imaging Device For Confocal Microscopy", *Optics Express*, vol. 9, No. 7, pp. 458–474, Mar. 26, 2001.

A. Drechsler et al., "Confocal Microscopy With A High Numerical Aperture Parabolic Mirror", *Optics Express*, vol., 9, No. 12, pp. 637–644, Dec. 3, 2001.

T. Rausch et al., "Effects Of Optical Spot/Magnetic Head Misalignment For Perpendicular Hybrid Magnetic Recording Systems", *Trans. Magn. Soc. Japan*, 2, pp. 322–327 (2002).

H. Hatano et al., "Plano-Convex Solid Immersion Mirror With A Small Aperture For Near-Field Optical Data Storage", *Optical Review*, vol. 9, No. 2, pp. 66–69 (2002).

C. W. Lee et al., "Feasibility Study On Near Field Optical Memory Using A Catadioptric Optical System", Samsung Electronics Co., Ltd., Korea, WA4-1/137–WA4-3/139.

* cited by examiner

HEAT ASSISTED MAGNETIC RECORDING HEAD WITH A PLANAR WAVEGUIDE

CROSS REFERENCE TO RELATED APPLICATION

This application claims the benefit of U.S. Provisional Application No. 60/392,249 filed Jun. 28, 2002.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

The invention relates to magnetic recording heads, and more particularly, to a heat assisted magnetic recording head with a planar waveguide.

BACKGROUND OF THE INVENTION

Magnetic recording heads have utility in a magnetic disc drive storage system. Most magnetic recording heads used in such systems today are "longitudinal" magnetic recording heads. Longitudinal magnetic recording in its conventional form has been projected to suffer from superparamagnetic instabilities at high bit densities.

Superparamagnetic instabilities become an issue as the grain volume is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy can demagnetize the stored data bits. Therefore, as the grain size is decreased in order to increase the areal density, a threshold is reached for a given material $K_u$ and temperature T such that stable data storage is no longer feasible.

An alternative to longitudinal recording that overcomes at least some of the problems associated with the superparamagnetic effect is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located around the main write pole for inducing a magnetic field between the pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

The thermal stability can be improved by employing a recording medium formed of a material with a very high $K_u$. However, with the available materials the recording heads are not able to provide a sufficient or high enough magnetic writing field to write on such a medium.

Another development that overcomes at least some of the problems associated with the superparamagnetic effect is "heat assisted magnetic recording" (HAMR), sometimes referred to as optical or thermal assisted recording. HAMR generally refers to the concept of locally heating a recording medium to reduce the coercivity of the recording medium so that the applied magnetic writing field can more easily direct the magnetization of the recording medium during the temporary magnetic softening of the recording medium caused by the heat source. HAMR allows for the use of small grain media, which is desirable for recording at increased areal densities, with a larger magnetic anisotropy at room temperature assuring a sufficient thermal stability. HAMR can be applied to any type of storage media, including for example tilted media, longitudinal media, perpendicular media or patterned media.

When applying a heat or light source to the medium, it is desirable to confine the heat or light to the track where writing is taking place and to generate the write field in close proximity to where the medium is heated to accomplish high areal density recording. In addition, for HAMR one of the technological hurdles to overcome is to provide an efficient technique for delivering large amounts of light power to the recording medium confined to sufficiently small optical spots. A variety of transducer designs have been proposed including, for example metal-coated glass fibers and hollow pyramidal structures with metal walls. For all these approaches, confinement of the light depends on an aperture which is fabricated into the end of the structure and which gives this kind of transducer the name "aperture probes." Generally these devices suffer from very low light transmission rendering the devices ineffective for HAMR recording. For example, tapered and metallized optical fibers have demonstrated light confinement down to approximately 50 nm with a throughput efficiency of $10^{-6}$. Pyramidal probes made from anisotropic etching of Si wafers have been designed with throughput efficiencies of $10^{-4}$ for similar spot sizes. Although this is the state of the art, it is still about two orders of magnitude too small for HAMR.

Accordingly, there is identified a need for an improved HAMR head that overcomes limitations, disadvantages, and/or shortcomings of known HAMR heads. In addition, there is identified a need for improved devices for applying a heat or light source to a recording medium that overcomes limitations, disadvantages, and/or shortcomings of known such devices.

SUMMARY OF THE INVENTION

In accordance with an aspect of the invention, a recording head includes a write pole and a planar waveguide adjacent to the write pole. The planar waveguide has at least one edge shaped to reflect an electromagnetic wave to a focal point within the planar waveguide. The planar waveguide has a truncated end adjacent to the focal point. The truncated end may be positioned so as to intersect the focal point. In addition, the at least one edge may have a substantially parabolic shape.

In accordance with another aspect of the invention, a disc drive storage system includes a recording medium and a heat assisted magnetic recording head positioned adjacent to the recording medium. The heat assisted magnetic recording head includes a write pole for applying a magnetic write field to the recording medium and a planar waveguide for heating the recording medium proximate to where the write pole applies the magnetic write field. The planar waveguide includes at least one edge that is shaped to reflect an electromagnetic wave to a focal point within the planar waveguide. The at least one edge may have a substantially parabolic shape. In addition, the planar waveguide includes a truncated end adjacent to the recording medium.

In accordance with yet another aspect of the invention, a heat assisted magnetic recording head for use in conjunction with a magnetic recording medium comprises a magnetic write pole, a planar waveguide, and a planar solid immersion lens. Specifically, the write pole is structured for applying a magnetic write field to the recording medium and the planar waveguide includes at least one edge shaped to reflect an electromagnetic wave to a focal point within the planar waveguide. The planar solid immersion lens is centered substantially at the focal point within the planar waveguide for heating the recording medium proximate to where the write pole applies the magnetic recording field.

In accordance with another aspect of the invention, an optical waveguide includes an edge shaped to reflect an electromagnetic wave to a focal point within the optical waveguide and a truncated end adjacent the focal point. The edge may have a substantially parabolic shape. In addition, the truncated end intersects the focal point within the planar optical waveguide.

DETAILED DESCRIPTION OF THE INVENTION

The invention encompasses optical waveguides that can produce a small optical spot that can be used, for example, in magnetic, magneto-optical and/or optical recording heads with various types of recording media. The invention is particularly suitable for use with a disc drive storage system, and more particularly for such a system that utilizes heat-assisted magnetic recording (HAMR). In addition, the invention may be used, for example, in optical probe data storage devices or in near field microscopy devices either as a confined light source below the diffraction limit or a light gathering device below the diffraction limit.

For HAMR, electromagnetic radiation (for example light) is used to heat a portion of a surface of a magnetic storage medium. This facilitates the subsequent recording of magnetic information in the heated portion of the medium. HAMR heads include means for directing the electromagnetic radiation onto the surface of the storage medium, and an associated means for producing a magnetic signal for affecting the magnetization of the storage medium.

Figure 1:
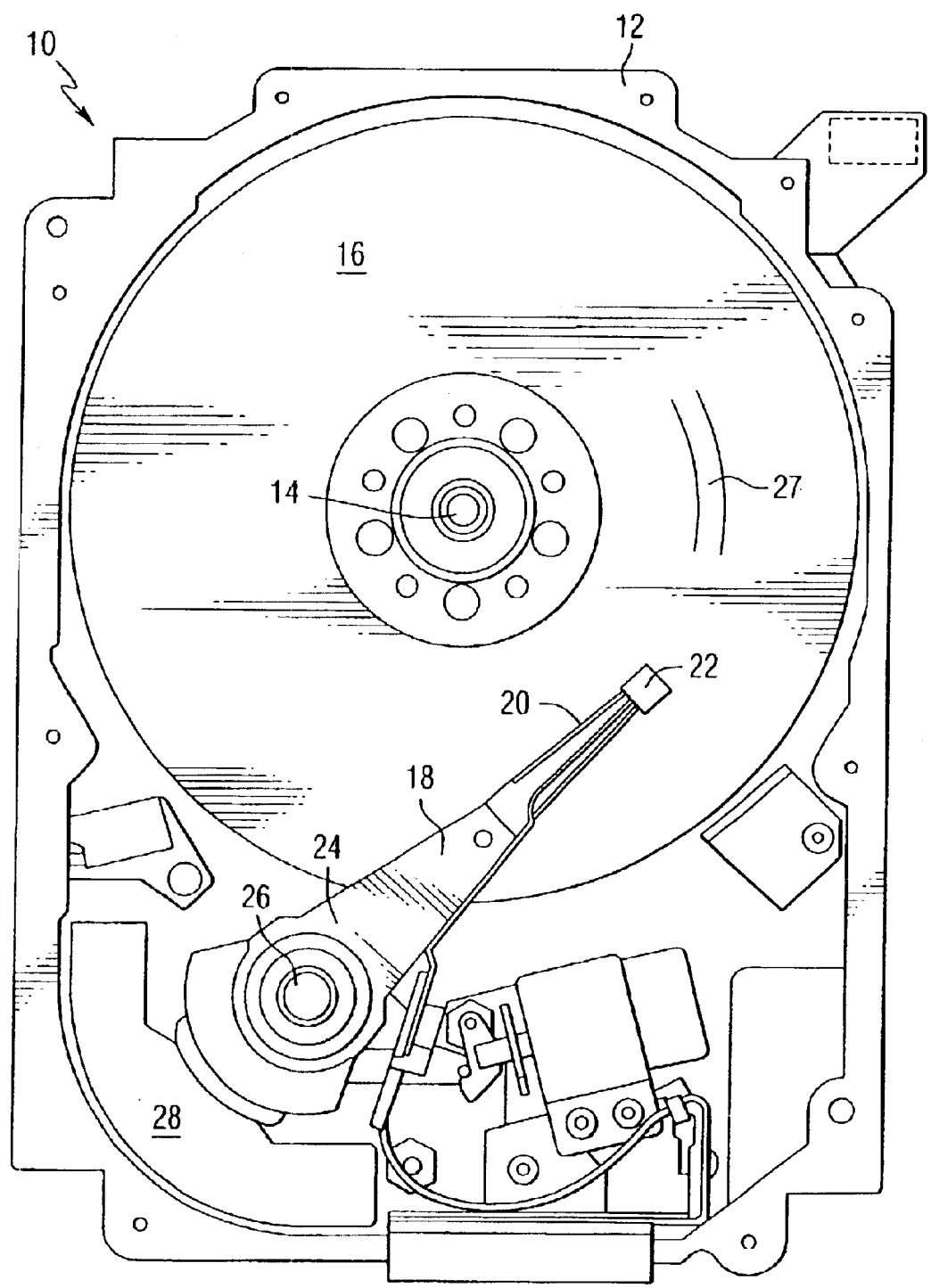
FIG. 1 is a pictorial representation of a disc drive storage system that can include a recording head constructed in accordance with this invention.

FIG. 1 is a pictorial representation of a disc drive 10 that can utilize a heat assisted magnetic recording head constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
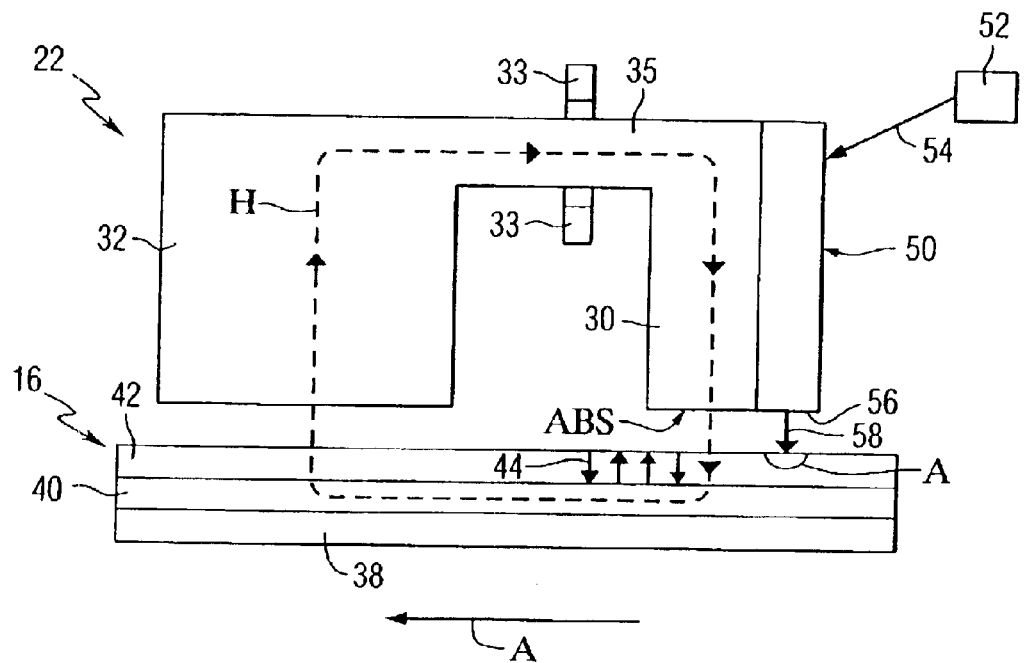
FIG. 2 is a schematic representation of a heat assisted magnetic recording head constructed in accordance with this invention.

FIG. 2 is a partially schematic side view of a HAMR head 22 and a magnetic recording medium 16. Although an embodiment of the invention is described herein with reference to recording head 22 as a perpendicular magnetic recording head and the medium 16 as a perpendicular magnetic recording medium, it will be appreciated that aspects of the invention may also be used in conjunction with other type recording heads and/or recording mediums where it may be desirable to employ heat assisted recording. Specifically, the HAMR head 22 may include a writer section comprising a main write pole 30 and a return or opposing pole 32 that are magnetically coupled by a yoke or pedestal 35. It will be appreciated that the HAMR head 22 may be constructed with a write pole 30 only and no return pole 32 or yoke 35. A magnetization coil 33 may surround the yoke or pedestal 35 for energizing the HAMR head 22. The HAMR head 22 also may include a read head, not shown, which may be any conventional type read head as is generally known in the art.

Still referring to FIG. 2, the recording medium 16 is positioned adjacent to or under the recording head 22 for movement, for example, in the direction of arrow A. The recording medium 16 includes a substrate 38, which may be made of any suitable material such as ceramic glass or amorphous glass. A soft magnetic underlayer 40 is deposited on the substrate 38. The soft magnetic underlayer 40 may be made of any suitable material such as, for example, alloys or multilayers having Co, Fe, Ni, Pd, Pt or Ru. A hard magnetic recording layer 42 is deposited on the soft underlayer 40, with the perpendicular oriented magnetic domains 44 contained in the hard layer 42. Suitable hard magnetic materials for the hard magnetic recording layer 42 may include, for example, FePt or CoCrPt alloys having a relatively high anisotropy at ambient temperature.

As illustrated in FIG. 2, the recording head 22 also includes structure for HAMR to heat the magnetic recording medium 16 proximate to where the write pole 30 applies the magnetic write field H to the recording medium 16. Specifically, such structure for HAMR may include, for example, a planar optical waveguide schematically represented by reference number 50. The waveguide 50 is in optical communication with a light source 52. The light source 52 may be, for example, a laser diode, or other suitable laser light sources for coupling a light beam 54 into the waveguide 50. Various techniques that are known for coupling light beam 54 into the waveguide 50 may be used in conjunction with the invention, such as, for example, the light source 52 may work in association with an optical fiber and external optics, such as an integrated spherical lens, for collimating the light beam 54 from the optical fiber toward a diffraction grating 68 (see FIG. 3). Alternatively, for example, a laser may be mounted on the waveguide 50 and the light beam 54 may be directly coupled into the waveguide 50 without the need for external optical configurations. Once the light beam 54 is coupled into the waveguide 50, the light may propagate through the optical waveguide 50 toward a truncated end 56 of the waveguide 50 that is formed adjacent the air-bearing surface (ABS) of the recording head 22.

Figure 3B:
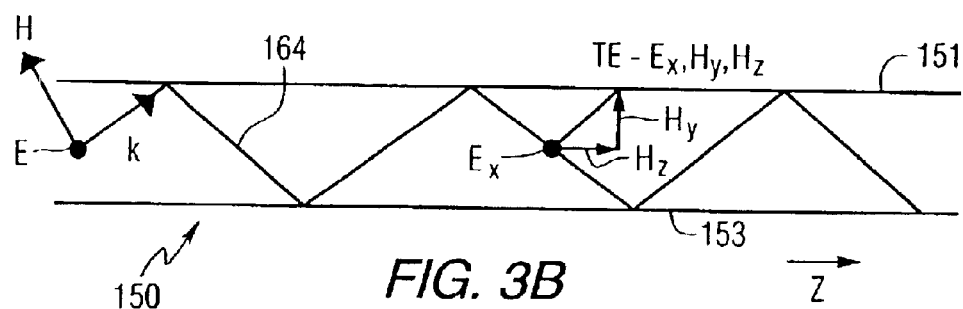
FIG. 3B is a schematic representation of a TE mode wave in a waveguide.
Figure 3C:
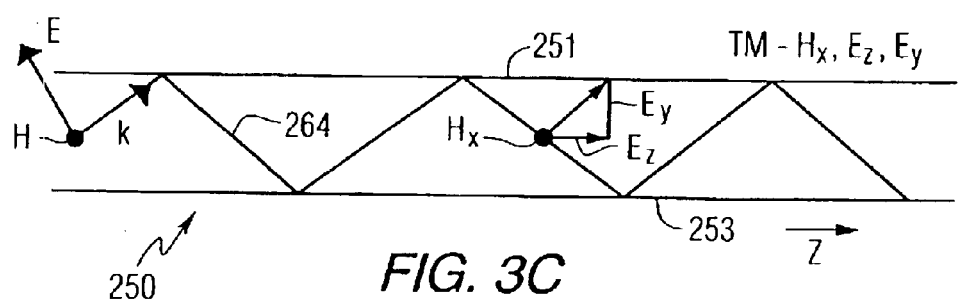
FIG. 3C is a schematic representation of a TM mode wave in a waveguide.
Figure 3A:
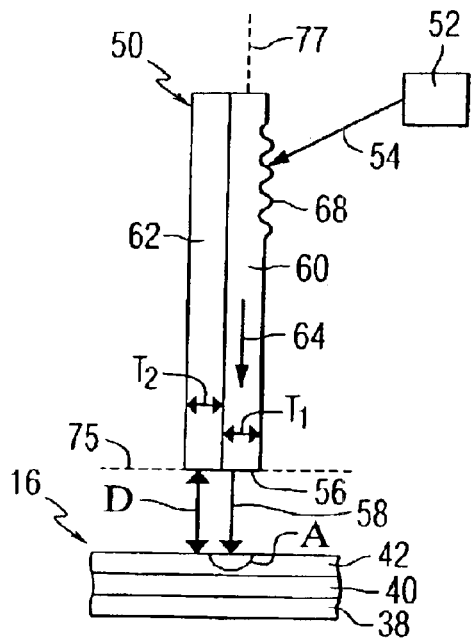
FIG. 3A is a schematic illustration side view of a planar waveguide constructed in accordance with this invention.

Referring to FIG. 3A, there is illustrated a side view of an embodiment of the planar waveguide 50. The waveguide 50 may include multiple layers of material having varying refractive indexes. Specifically, the waveguide 50 may include a core layer 60 with a cladding layer 62 formed on a side thereof. The diffraction grating 68 may be integrally formed with the core layer 60. The core layer 60 may have a refractive index greater than a refractive index of the cladding layer 62. This enables the core layer 60 to more efficiently transmit the light energy or electromagnetic wave, designated generally by arrow 64 through the core layer 60 toward the truncated end 56 of the waveguide 50 for heating the recording medium 16. Electromagnetic radiation, generally designated by reference number 58, is transmitted from the truncated end 56 for heating the recording medium 16, and particularly for heating a localized area "A" of the recording layer 42.

The core layer may have a refractive index of about 1.9 to about 4.0. In contrast, the cladding layer 62 may have a refractive index of about 1.0 to about 2.0. By forming the core layer 60 with a higher refractive index than the cladding layer 62, the core layer 60 is able to most efficiently guide the propagating waveguide mode by total internal reflection. In addition, by increasing the ratio of the core layer 60 refractive index to the cladding layer 62 refractive index (for the refractive index ranges stated herein), the energy of the propagating mode can be more greatly confined within the core layer 60.

The core layer 60 may be formed of a material such as, for example, $Ta_2O_5$, $TiO_2$, ZnSe, Si, SiN, GaP or GaN. In addition, the core layer 60 may have a thickness $T_1$ of about 20 nm to about 500 nm. The cladding layer 62 may be formed of a material such as, for example, $SiO_2$, air, $Al_2O_3$ or $MgF_2$. The cladding layer 62 may have a thickness $T_2$ in the range of about 200 nm to about 2000 nm. The cladding layer 62 should be sufficiently thick such that the electric field from the propagating waveguide mode does not extend appreciably beyond the cladding layer 62 and thereby interact with any materials or structure outside of the waveguide 50. By increasing the ratio of the core layer 60 thickness to the cladding layer 62 thickness (for the thickness ranges stated herein), the energy of the propagating mode can be more greatly confined within the core layer 60.

Still referring to FIG. 3A, the truncated end 56 may be spaced apart from the recording medium 16 a distance D of about 1 nm to about 100 nm. By positioning the truncated end 56 in close proximity to the recording medium 16, the electromagnetic radiation 58 is more efficiently transmitted to the recording medium 16 for the heating thereof. In addition, because the near field radiation expands very quickly after leaving the truncated end 56 of the waveguide 50, the region of highest light confinement occurs directly adjacent the truncated end 56.

FIG. 3B is a schematic representation of a TE mode wave, such as electromagnetic wave 164, in a waveguide 150. The electromagnetic wave 164 is polarized in the TE mode such that the electric field E is perpendicular to the plane of the figure and the magnetic field H has components $H_y$ and $H_z$ with component $H_z$ lying in a direction parallel to the axis of the waveguide 150. The electromagnetic wave 164 is shown to reflect off of the sides 151, 153 (although it will be appreciated that a portion of the wave 164 actually may penetrate the sides 151, 153 as determined by the refractive index thereof) as it propagates through the waveguide 150.

FIG. 3C is a schematic representation of a TM mode wave, such as electromagnetic wave 264, in a waveguide 250. The electromagnetic wave 264 is polarized in the TM mode such that the magnetic field H is perpendicular to the plane of the figure and the electric field E has components $E_y$ and $E_z$, with component $E_z$ lying in a direction parallel to the axis of the waveguide 250. The electromagnetic wave 264 is shown to reflect off of the sides 251, 253 (although it will be appreciated that a portion of the wave 164 may actually penetrate the sides 251, 253 as determined by the refractive index thereof) as it propagates through the waveguide 250.

Figure 4:
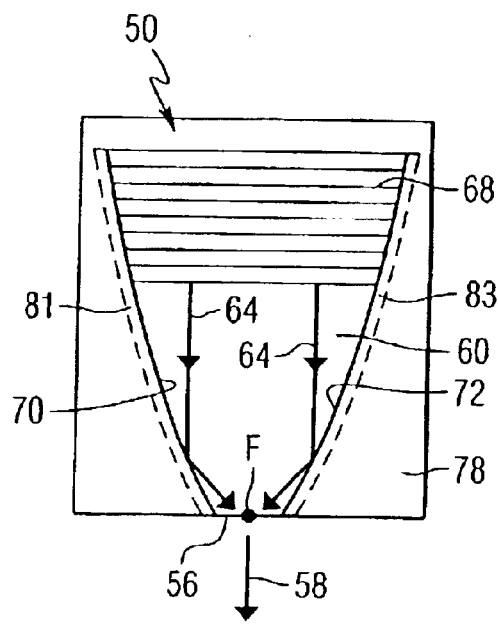
FIG. 4 is a front view of an embodiment of a core layer constructed in accordance with this invention.
Figure 5:
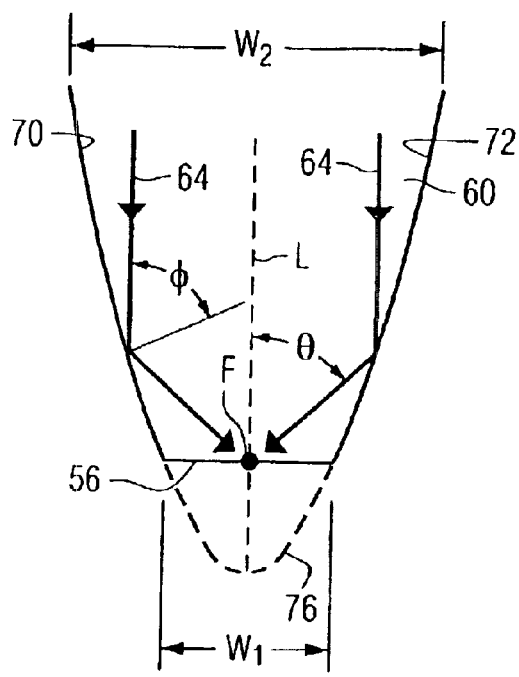
FIG. 5 is an enlarged front view of a portion of the core layer illustrated in FIG. 4.

Referring to FIGS. 4 and 5, an embodiment of the core layer 60 will be described in more detail. Specifically, FIG. 4 illustrates a front view of the core layer 60 with the diffraction grating 68 integrally formed therewith. FIG. 5 illustrates an enlarged front view of a bottom portion of the core layer 60 illustrated in FIG. 4. The core layer 60 includes edges 70, 72 that are shaped to reflect the electromagnetic waves 64 toward a focal point F of the core layer 60 of the waveguide 50. As illustrated, the edges 70, 72 may have a substantially parabolic shape for reflecting the electromagnetic waves 64 generally toward the focal point F. However, it should be understood that other edge shapes can be used if the incoming electromagnetic wave is conditioned such that the combination of the wave characteristics and the edge shape result in the desired focusing of the wave generally at the focal point F.

Still referring to FIGS. 4 and 5, the core layer 60 includes a truncated end 56 that is adjacent the recording medium 16. The truncated end 56 of the core layer 60 may have a width $W_1$, for example, in the range of about 1 μm to about 10 μm. The width $W_1$ may vary depending, for example, on the particular shape of the edges 70, 72 that are selected for forming the core layer 60. In addition, the width $W_1$ may vary depending on the desirability of having a large ratio of input width $W_2$ to output width $W_1$ so that there is a large concentration of energy being transmitted from the truncated end 56.

The truncated end 56 may be formed by, for example, e-beam lithography in photoresist followed by subsequent reactive ion etching, or by chemical-mechanical polishing techniques that are generally known in the art.

The truncated end 56 may be formed such that the truncated end 56 intersects the focal point F of the core layer 60. More specifically, the truncated end 56 may be substantially contained within a first plane (as illustrated by dotted line 75 in FIG. 3A) that is substantially perpendicular to a second plane (as illustrated by dotted line 77 in FIG. 3A) that substantially contains the planar waveguide 50 or the core layer 60 thereof. However, it will be appreciated that the truncated end 56 may be contained in a plane that is other than perpendicular to the plane of the waveguide 50.

Advantageously, by truncating an end of the waveguide 50, and particularly an end of the core layer 60, at the focal point F thereof, there is provided a system for efficient localized heating of the recording medium 16. The electromagnetic waves 64 that strike the edges 70, 72 are reflected towards the focal point F at an angle θ, wherein θ equals the angle of incidence at the focal point F with respect to a longitudinal axis L of the waveguide 50 (see FIG. 5). The electromagnetic waves which are reflected towards the focal point F at the highest angles θ will, in general, enable the smallest optical spots adjacent the focal region thereof. These electromagnetic waves are generally coupled through evanescent fields into the recording medium 16, because in the absence of the recording medium 16 these waves would suffer total internal reflection within the waveguide 50.

Another advantage is that the distance D between the truncated end 56 and recording medium 16 is minimized. The energy that is focused at the focal point F may therefore be positioned in closer proximity to the recording medium than if the truncated portion of the core layer 60, as designated by dotted line 76 in FIG. 5, remained a part of the core layer 60. Because of the rapid spread of optical spot size beneath the waveguide 50 and the rapid decrease in field amplitude, it is important that the recording medium 16 be positioned as close as is possible to the truncated end 56 of the waveguide 50.

Still referring to FIG. 4, a low index dielectric material 78 may be formed on at least a portion of a perimeter of the core layer 60. The layer of material 78 may be formed of, for example, air, $MgF_2$, $SiO_2$, or $Al_2O_2$. The layer of material 78 must be sufficiently thick to contain substantially all of the evanescent fields from the waveguide modes. This allows then for any other material which is deposited on the outside of the layer of material 78 to have no effect on the propagation or dissipation properties of the waveguide 50.

Alternatively or in combination therewith, the core layer 60 may have a layer of reflective material, as indicated by dashed lines 81, 83 formed along at least a part of the edges 70, 72, respectively, in lieu of or in addition to the layer of material 78. The reflective layers 81, 83 may be formed of, for example, Au, Ag, Al, Cu, Pt or Ir. The reflective layers 81, 83 help insure low loss reflection of the electromagnetic waves 64 within the core layer 60.

As an example of the invention, the core layer 60 may be made of a 140 nm layer of $Ta_2O_5$ with a refractive index of 2.2 at 400 nm. The core layer 60 may be positioned between the cladding layer 62 formed of a 2000 nm layer of $SiO_2$ with a refractive index of 1.5 on one side thereof and air, which acts as an additional cladding layer, on the other side of the core layer 60. It will be appreciated that in place of air, an additional cladding layer made out of a material similar as may be used to form the cladding layer 62 may be positioned on the other side of the core layer 60 as well. For this particular example, the lowest order propagating TE mode has an effective index of 2. The critical angle within the parabolic shaped core layer 60 is determined to be <49° for any transmitted modes with effective indices of about 1.5 or less. Thus, for this example essentially all of the electromagnetic waves 64 striking the edges 70, 72 of the core layer 60 will be substantially reflected toward the focal point F. The critical angle should be such that φ (wherein φ equals the angle of incidence measured at the reflecting surface as shown in FIG. 5) is greater than the critical angle to provide total internal reflection.

Figure 6:
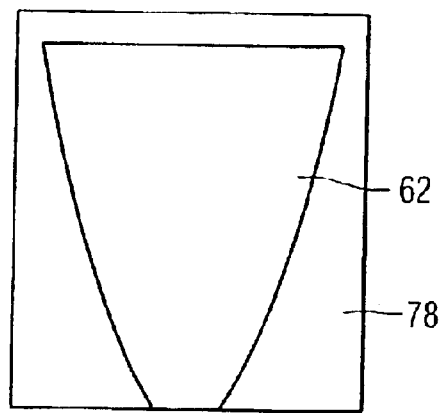
FIG. 6 is a front view of a cladding layer constructed in accordance with this invention.

Referring to FIG. 6, there is illustrated a front view of an embodiment of the cladding layer 62 of FIG. 3. The cladding layer 62 may have a substantially parabolic shape similar to the shape of the core layer 60. It will be appreciated that the cladding layer 62 may have other shapes and configurations and is not limited to being constructed in the same form or shape as the core layer 60. However, it is preferred that the cladding layer 62 at least cover or coincide with the surface area of the core layer 60, although the cladding layer may extend beyond the core layer 60 as well.

Still referring to FIG. 6, if the cladding layer 62 is formed to have the substantially parabolic shape as shown, the low index dielectric material 78 may be formed on at least a portion of the perimeter of the cladding layer 62 like the layer of material 78 described herein with reference to FIG. 4. The layer of material 78 may be provided to isolate the evanescent fields extending from the waveguide 50 from interacting with any other structures or material outside of the waveguide 50.

Figure 7:
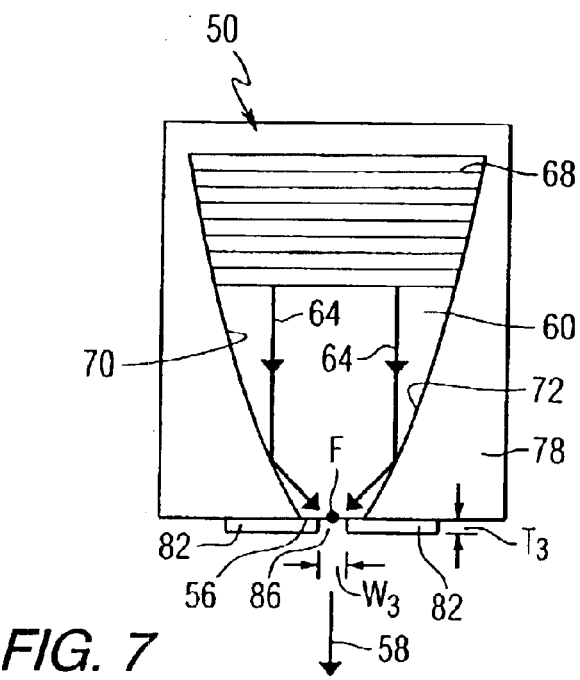
FIG. 7 is a view of the core layer set forth in FIG. 4 illustrating additional aspects of the invention.

Referring to FIG. 7, there is illustrated another aspect of the invention. Specifically, an end layer 82 may be formed adjacent the truncated end 56 of the core layer 60. The end layer 82 may have a thickness $T_3$ in the range of about 10 nm to about 100 nm. The end layer 82 defines an aperture 86 adjacent the focal point F. The aperture may have a width $W_3$ in the range of about 10 nm to about 500 nm. It will be appreciated that the aperture width $W_3$ is smaller than the opening width $W_1$ to further reduce the size of the heated spot or optical spot created by the electromagnetic radiation 58 that passes therethrough. The end layer 82 may be formed of a material, such as, for example, Al, Au, Ag, Cu, Pt or Ir. The aperture 86 may be formed in the end layer 82 by ion milling or etching techniques using lithography. Although the transmission efficiency of sub-wavelength apertures is generally known to be low, by first concentrating the electromagnetic waves 64 at the focal point F, the throughput efficiency of the electromagnetic radiation 58 can be greatly enhanced. The end layer 82 also serves to shield the recording medium 16 from any evanescent fields around the edges of the waveguide 50, and particularly at the corners of the waveguide 50 where the truncated end 56 is formed.

Figure 8:
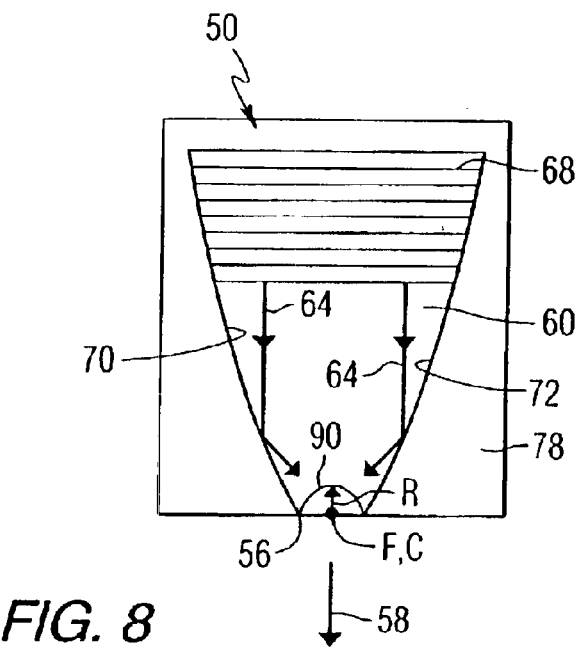
FIG. 8 is a view of the core layer set forth in FIG. 4 illustrating additional aspects of the invention.

Referring to FIG. 8, there is illustrated an additional aspect of the invention. Specifically, the core layer 60 may include a planar solid immersion lens 90 that is centered substantially at the focal point F (i.e., the center point C of the lens 90 is substantially coincident with the focal point F) within the waveguide 50 or, more particularly, within the core layer 60. The lens 90 may be formed of a material such as, for example, $TiO_2$, GaP, GaN, Si, ZnS, ZnSe, or SiN. In addition, the lens 90 may have a radius R in the range of about 10 μm to about 10 mm and a refractive index in the range of about 1.7 to about 4.0. In accordance with this particular aspect of the invention, the electromagnetic waves 64 are reflected on the edges 70, 72 of the core layer 60 and focused toward the lens 90. An advantage of this arrangement is the ability to make the lens 90 from a very high index but slightly lossy dielectric material. Only in the proximity of the focal point F does the electromagnetic waves 64 enter the high index material so it does not require the need to propagate very far before reaching the focal point F and the electromagnetic wave is not heavily absorbed by the high index dielectric. The wavelength of the electromagnetic waves 64 is further reduced and the final focused spot generated by the lens 90 is made even smaller.

For an example of the embodiment illustrated in FIG. 8, the lens 90 may be composed of $TiO_2$ which has a refractive index of 3.2 at 400 nm and this material is slightly lossy with a K of 0.01. If the radius of the lens 90 is 5 μm, approximately 20% of the incident power would be transmitted to the focal point F and thus generated as electromagnetic radiation 58 for heating the recording medium 16. This particular example results in an optical spot size of about 55 nm. Use of the lens 90 in association with the core layer 60 may result in an optical spot being generated with a size of about 50 nm to about 1000 nm.

The shape of the lens 90 may be essentially circular or semi-circular to match the circular wavefront from the core layer 60 having a generally parabolic shape that is converging to the focal point F. It will be appreciated that other shapes of lens are also suitable for use with the invention if the particular shape of the core layer is not substantially parabolic or there are other mitigating factors which may generate a non-spherical wavefront being generated.

Figure 9:
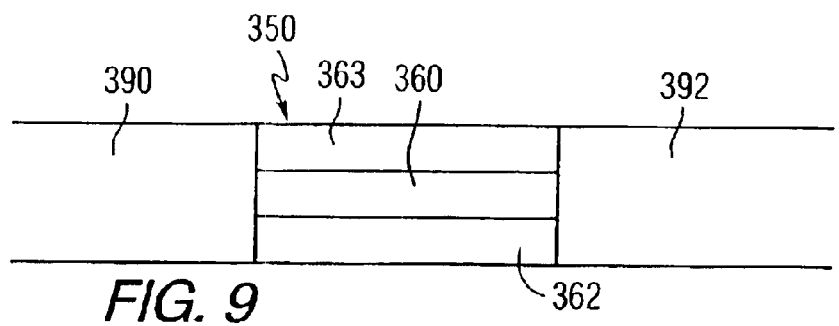
FIG. 9 is a top view of an additional embodiment of a planar waveguide constructed in accordance with this invention.

Referring to FIG. 9, there is illustrated a top view of another embodiment of the invention. Specifically, there is shown a top view of a planar waveguide 350 having a core layer 360, a cladding layer 362 on one side thereof and an additional cladding layer 363 formed on an opposing side of the core layer 360. The core layer 360, as well as the cladding layers 362, 363 may be made of similar materials with similar sizes as described herein for core layer 60 and cladding layer 62, respectively. Formed along the perimeter of the layers 360, 362, 363 are additional layers of material 390, 392 that may take the form of, for example, a layer of reflective material (similar to the layers of reflective material 81, 83 illustrated in FIG. 4) or may take the form of a low index dielectric material (similar to the layer 78 illustrated in FIGS. 4 and 6).

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A recording head, comprising:
   a write pole; and
   a planar waveguide adjacent to said write pole, said planar waveguide having at least one edge shaped to reflect an electromagnetic wave to a focal point within the planar waveguide, said planar waveguide having a truncated end adjacent to said focal point, wherein said at least one edge has a substantially parabolic shape.

2. The recording head of claim 1, wherein said truncated end intersects the focal point.

3. The recording head of claim 1, wherein said truncated end is substantially contained within a first plane and said planar waveguide is substantially contained within a second plane, said first plane being substantially perpendicular to said second plane.

4. The recording head of claim 1, wherein said truncated end is substantially planar.

5. The recording head of claim 1, wherein said truncated end has a width of about 1 μm to about 40 μm.

6. The recording head of claim 1, further including an end layer formed adjacent said truncated end, said end layer defining an aperture.

7. The recording head of claim 6, wherein said aperture has a width of about 10 nm to about 500 nm.

8. The recording head of claim 6, wherein said aperture is substantially aligned with the focal point.

9. The recording head of claim 6, wherein said end layer has a thickness of about 10 nm to about 100 nm.

10. The recording head of claim 6, wherein said end layer comprises a metal or metal alloy material.

11. The recording head of claim 1, wherein said planar waveguide includes a core layer comprising $Ta_2O_5$, $TiO_2$, ZnSe, Si, SiN, GaP or GaN.

12. The recording head of claim 11, wherein said core layer has a thickness of about 20 nm to about 500 nm.

13. The recording head of claim 11, wherein said core layer has a refractive index of about 1.9 to about 4.0.

14. The recording head of claim 11, wherein said core layer has a substantially parabolic shape.

15. The recording head of claim 11, wherein said planar waveguide further includes a cladding layer formed adjacent a side of said core layer.

16. The recording head of claim 15, wherein said cladding layer comprises $SiO_2$, air, $MgF_2$ or $Al_2O_3$.

17. The recording head of claim 15, wherein said cladding layer has a thickness of about 200 nm to about 2000 nm.

18. The recording head of claim 15, wherein said cladding layer has a refractive index of about 1.0 to about 2.0.

19. The recording head of claim 15, wherein said cladding layer has a substantially parabolic shape.

20. The recording head of claim 15, wherein said planar waveguide, further includes an additional cladding layer formed adjacent an opposing side of said core layer.

21. The recording head of claim 15, wherein said core layer has a refractive index greater than a refractive index of said cladding layer.

22. The recording head of claim 1, further including means for coupling a light source into said planar waveguide for generating the electromagnetic wave.

23. The recording head of claim 1, further including a layer of reflective material formed adjacent said at least one edge.

24. A disc drive storage system, comprising:
   a recording medium; and
   a heat assisted magnetic recording head positioned adjacent to said recording medium, said heat assisted magnetic recording head comprising:
      a write pole for applying a magnetic write field to said recording medium; and
      a planar waveguide for heating said recording medium proximate to where said write pole applies the magnetic write field to said recording medium, said planar waveguide having at least one edge shaped to reflect an electromagnetic wave to a focal point within the planar waveguide, said planar waveguide having a truncated end adjacent said recording medium, wherein said at least one edge has a substantially parabolic shape.

25. The system of claim 24, wherein said truncated end is spaced apart from said recording medium a distance of about 1 nm to about 100 nm.

26. A heat assisted magnetic recording head for use in conjunction with a magnetic recording medium, comprising:
   a magnetic write pole for applying a write field to the recording medium;
   a planar waveguide having at least one edge shaped to reflect an electromagnetic wave to a focal point within said planar waveguide; and a planar solid immersion lens centered substantially at the focal point within the planar waveguide for heating the recording medium proximate to where said magnetic write pole applies the write field.

27. The heat assisted magnetic recording head of claim 26, wherein said planar waveguide includes a truncated end that intersects the focal point.

28. The heat assisted magnetic recording head of claim 26, wherein said planar waveguide has a substantially parabolic shape.

29. The heat assisted magnetic recording head of claim 26, wherein said planar solid immersion lens comprises $TiO_2$, ZnSe, SiN, Si, GaP, or GaN.

30. The heat assisted magnetic recording head of claim 26, wherein said planar solid immersion lens has a refractive index of about 1.7 to about 4.0.

31. The heat assisted magnetic recording head of claim 26, wherein said planar solid immersion lens has a radius of about 10 $\mu$m to about 10 mm.

32. The heat assisted magnetic recording head of claim 26, wherein said planar solid immersion lens generates an optical spot for heating the magnetic recording medium, the optical spot having a size of about 50 nm to about 1000 nm.

33. An optical waveguide, comprising:
an edge shaped to reflect an electromagnetic wave to a focal point within the optical waveguide; and
a truncated end adjacent the focal point, wherein said edge has a substantially parabolic shape.

34. The optical waveguide of claim 33, wherein said truncated end intersects the focal point.

* * * * *

UNITED STATES PATENT AND TRADEMARK OFFICE
CERTIFICATE OF CORRECTION

PATENT NO. : 6,944,112 B2  
DATED : September 13, 2005  
INVENTOR(S) : William A. Challener Page 1 of 1

It is certified that error appears in the above-identified patent and that said Letters Patent is hereby corrected as shown below:

Column 10,
Line 30, after "waveguide", delete ",".

Signed and Sealed this

Eleventh Day of April, 2006

JON W. DUDAS
*Director of the United States Patent and Trademark Office*